United States Patent
Echegaray et al.

(10) Patent No.: US 9,684,756 B1
(45) Date of Patent: Jun. 20, 2017

(54) ASSIGNING NETS TO WIRING PLANES USING ZERO WIRE LOAD AND SIGNAL PROPAGATION TIMING FOR CHIP DESIGN

(71) Applicant: International Business Machines Corporation, Armonk, NY (US)

(72) Inventors: Alexandra Echegaray, Wappingers Falls, NY (US); Bernd Kemmler, Tuebingen (DE); Jesse P. Surprise, Highland, NY (US); Stephen K. Szulewski, Newburgh, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/005,734

(22) Filed: Jan. 25, 2016

(51) Int. Cl.
*G06F 17/50* (2006.01)

(52) U.S. Cl.
CPC ...... *G06F 17/5077* (2013.01); *G06F 17/5081* (2013.01); *G06F 17/5031* (2013.01); *G06F 17/5068* (2013.01)

(58) Field of Classification Search
CPC ............. G06F 17/5077; G06F 17/5081; G06F 17/5031; G06F 17/5068
See application file for complete search history.

(56) References Cited

U.S. PATENT DOCUMENTS

| | | | | |
|---|---|---|---|---|
| 6,591,407 B1 * | 7/2003 | Kaufman | ............ | G06F 17/5068 716/114 |
| 6,618,834 B2 * | 9/2003 | Takeyama | ........... | G06F 17/5045 716/102 |
| 7,225,421 B2 * | 5/2007 | Migatz | ................ | G06F 17/5068 716/114 |
| 8,124,429 B2 * | 2/2012 | Norman | .................. | H01L 23/50 257/E21.526 |
| 8,640,075 B2 * | 1/2014 | Alpert | ................... | G06F 17/505 716/134 |
| 8,776,000 B2 * | 7/2014 | Chang | ................. | G06F 17/5031 716/100 |
| 9,038,009 B2 * | 5/2015 | Alpert | ................... | G06F 17/505 716/108 |
| 2009/0106709 A1 | 4/2009 | Carney et al. | | |
| 2013/0298097 A1 * | 11/2013 | Chang | ................. | G06F 17/5031 716/113 |

(Continued)

OTHER PUBLICATIONS

List of IBM Patents or Applications Treated as Related.

*Primary Examiner* — Naum B Levin
(74) *Attorney, Agent, or Firm* — Sherman IP LLP; Kenneth L. Sherman; Steven Laut

(57) ABSTRACT

Nets are assigned to wiring planes for generating a chip design. A computer is caused to execute a zero wire load timing session for a placed but unbufferred chip design. All nets of the chip design are set to a single wide wiring track without wiring plane assignments. A delta time delay is added to each sink of each of the nets to represent an estimated time of flight (TOF) delay. The nets wiring plane or width type for a particular pin is upgraded to a type having improved TOF characteristics. Each of the nets are compared against new predetermined slack and distance targets and new assigned wiring plane or width type determined to consume additional wiring track resources, and based on results, the upgrade is repeated or a design for session timing state for the nets is output to represent the unbufferred chip design.

1 Claim, 4 Drawing Sheets

(56) References Cited

U.S. PATENT DOCUMENTS

2013/0326450 A1* 12/2013 Alpert .................. G06F 17/505
  716/114
2014/0101629 A1   4/2014 Alpert et al.

* cited by examiner

ASSIGNING NETS TO WIRING PLANES USING ZERO WIRE LOAD AND SIGNAL PROPAGATION TIMING FOR CHIP DESIGN

BACKGROUND

There are a limited number of wiring tracks available to a chip design. Wiring tracks are a valuable and limited resource in chip designs. Most existing solutions for assigning nets to particular wiring planes and/or widths require that the design already have buffers inserted. The existing methods may also assign nets inappropriately based on distance.

SUMMARY

Embodiments of the invention relate to assigning nets to wiring planes that have better signal propagation properties based upon the net's topology and the zero wire load model timing of the timing paths the net is associated with before the design has buffers added in. One embodiment includes a computer program product for assigning nets to wiring planes for generating a chip design, the computer program product comprising a computer readable storage medium having program instructions embodied therewith, the program instructions executable by a computer to cause the computer to: execute, by the computer, a zero wire load timing session for a placed but unbufferred chip design comprising integrated circuits including a plurality of gates and nets, a unit design or both the integrated circuits and the unit design. All nets of the chip design are set by the computer to a single wide wiring track without wiring plane assignments. The computer adds a delta time delay to each sink of each of the nets to represent an estimated time of flight (TOF) delay based upon the nets assigned wiring plane or width type and distance of a particular sink to a source. The TOF delay is equal to determining (TOF pico second (ps)/millimeter (mm) for wiring plane or width type)*(sink to source distance in mm). The computer upgrades the nets wiring plane or width type for a particular pin to a type having improved TOF characteristics to improve timing upon a determination that the particular pin fails a predetermined slack and distance target, and re-determining the TOF delay based on the upgrade. The computer further compares each of the nets against new predetermined slack and distance targets and new assigned wiring plane or width type determined to consume additional wiring track resources. Based on results of the compare, the computer either repeats the upgrading or outputs a design for session timing state for the nets to represent the unbufferred chip design with the nets assigned to wiring plane or width types for use by a buffering tool to assist in the unbuffered chip design's timing closure and to provide to the buffering tool priority for particular nets assigned to wiring plane or width types that are more difficult to close timing on than other particular nets for improved buffer placement.

These and other features, aspects and advantages of the present invention will become understood with reference to the following description, appended claims and accompanying figures.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

One or more embodiments assign nets to wiring planes that enjoy better signal propagation properties (i.e., better time of flight (TOF) characteristics) based upon the net's topology and the zero wire load (ZWL) model timing of the timing paths the net is associated with before the design has buffers added in. Overuse or inappropriate assignment of nets to more valuable wiring planes might lead to a chip design to suffer excessive wiring congestion, timing closure troubles and noise integrity issues. One or more embodiments use the least amount of the valuable wiring planes' resources as possible that enjoy better TOF characteristics than what may occur if nets are inappropriately assigned based upon the ZWL of the random logic macro (RLMs).

One or more embodiments provide that each net, before buffering, is assigned to a particular wiring plane and type based on its need from a timing closure standpoint and the nets specific topology. Advantages of one or more embodiments may include: using lesser amounts of the valuable wiring planes resources that enjoy better TOF characteristics than what can occur if nets are inappropriately assigned; quicker turn around time (TAT) for a timing analysis than would occur if a chip design were fully buffered and the design's nets planes and types were assigned in a different fashion; and once the unbuffered nets in the design are assigned planes and widths, a buffering tool gives priority to the nets assigned to the more valuable planes. This leads to better placement for the more timing critical nets right from the start of the buffering process.

One or more embodiments provide that a chip or unit designs zero timing is estimated based upon: the design's ZWL timing model to calculate the "silicon" delay; and each sink of each net is given a TOF delay component based upon its distance from the nets source and an estimated TOF per millimeter characteristics for its assigned wiring plane and/or width type.

Figure 1:
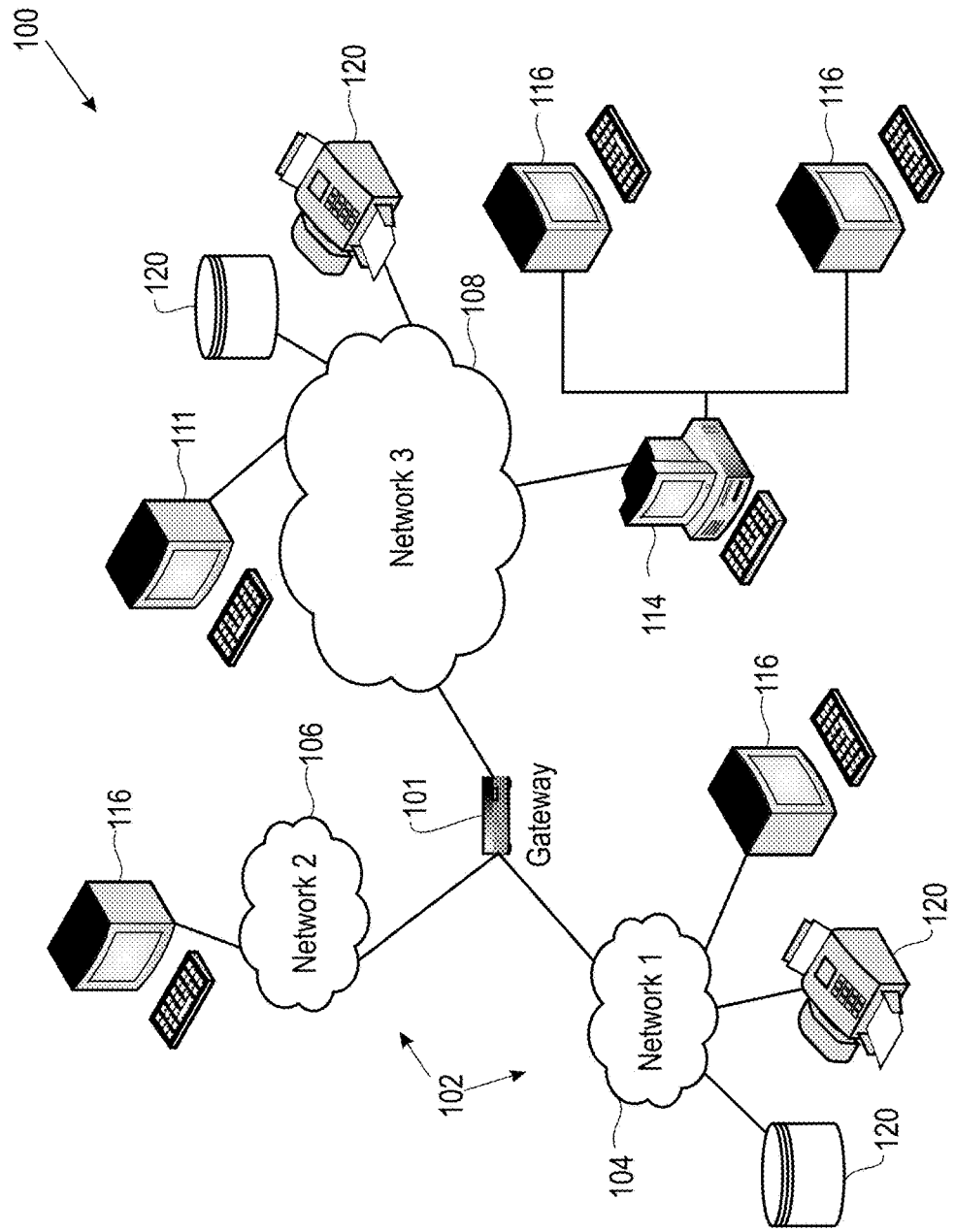
FIG. 1 is a network architecture for migration of large data from an on-line content management system to an archival management system, according to an embodiment of the present invention.

FIG. 1 illustrates a network architecture 100, in accordance with one embodiment. As shown in FIG. 1, a plurality of remote networks 102 are provided, including a first remote network 104 and a second remote network 106. A gateway 101 may be coupled between the remote networks 102 and a proximate network 108. In the context of the present network architecture 100, the networks 104, 106 may each take any form including, but not limited to, a LAN, a WAN, such as the Internet, public switched telephone network (PSTN), internal telephone network, etc. In one embodiment, the network architecture 100 employs a POSIX® based file system.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 2:
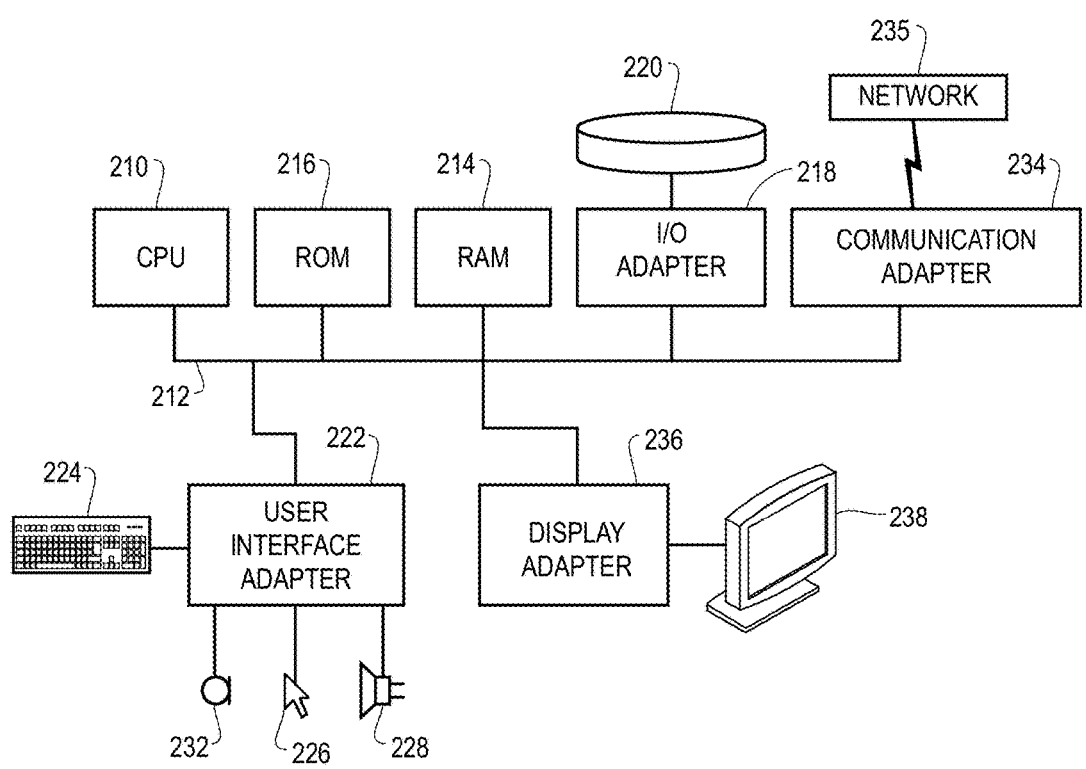
FIG. 2 shows a representative hardware environment that may be associated with the servers and/or clients of FIG. 1, according to an embodiment.

FIG. 2 shows a representative hardware system 200 environment associated with a user device 116 and/or server 114 of FIG. 1, in accordance with one embodiment. In one example, a hardware configuration includes a workstation having a central processing unit 210, such as a microprocessor, and a number of other units interconnected via a system bus 212. The workstation shown in FIG. 2 may include a Random Access Memory (RAM) 214, Read Only Memory (ROM) 216, an I/O adapter 218 for connecting peripheral devices, such as disk storage units 220 to the bus 212, a user interface adapter 222 for connecting a keyboard 224, a mouse 226, a speaker 228, a microphone 232, and/or other user interface devices, such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

In one example, the workstation may have resident thereon an operating system, such as the MICROSOFT WINDOWS Operating System (OS), a MAC OS, a UNIX OS, etc. In one embodiment, the system 200 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 3:
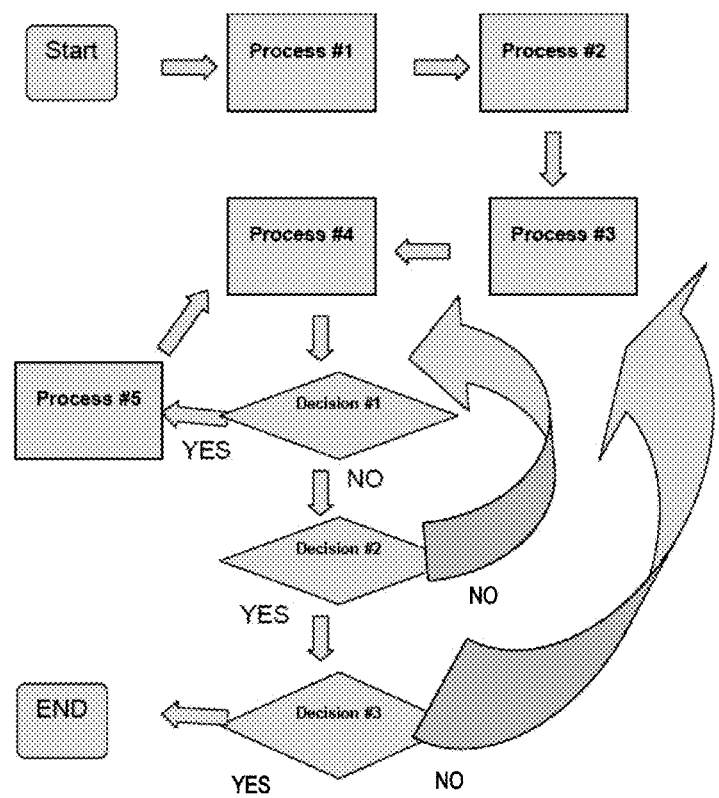
FIG. 3 shows an example flow for a process for assigning nets to wiring planes for generating a chip design, according to an embodiment.

FIG. 3 shows an example flow for a process 300 for assigning nets to wiring planes for generating a chip design, according to an embodiment. On a typical chip design, the majority of nets are assigned to a default wiring plane and width (e.g., a single width wiring track wire code with no planes assignment). A minority of nets involved with more challenging timing paths do require, for timing closure purposes, the better TOF characteristics of wires (usually wider and and/or thicker than default type wires) found with particular wiring planes and/or widths. Typically nets that use wider or thicker types of wiring segments take up more wiring tracks. Care must be taken not to overload a chip design with too many of these types of wires since there are a limited number of wiring tracks available to a chip design. Over use or inappropriate assignment of nets to the more valuable wiring planes might lead to a chip design to suffer excessive wiring congestion, timing closure trouble and noise integrity issues. In one embodiment, process 300 uses the least amounts of the valuable wiring planes resources possible that enjoy better TOF characteristics than what can occur if nets are inappropriately assigned based upon the ZWL of the RLMs. Process 300 also identifies timing paths that would be impossible to solve even with an ideal wire/buffer solution.

In one embodiment, process 300 may be executed using a computing device, such as a processor, workstation, computer, specialized ASIC, etc. (e.g., CPU 210 of a workstation, FIG. 2, a computing device, e.g., a user device 116, FIG. 1, etc.). Process 1 provides that a ZWL timing session is run on a placed but unbufferred chip (e.g., integrated circuits including millions of gates and nets, etc.) and/or unit design. Process 2 provides that all of the of the chip/unit nets are set to single wide wiring track with no wiring plane assignments (i.e., the default wire type), which is the slowest type of wire type with the worst TOF characteristics and uses the least wiring track resources. Therefore, in process 2, the computing device iterates through each pin and each net in the design assigning TOF delay based on layer assignment.

In one embodiment, in process 3, a delta time delay is added to each sink of every net to represent the estimated TOF delay based upon the nets assigned plane/width type and the distance of the particular sink to the source. In one embodiment, TOF delay=(TOF ps/mm for plane/width type) *(sink to source distance in mm). Therefore, in process 3, the computing device iterates through wiring planes and widths with increasingly better TOF characteristics. In process 4, if the particular pin fails a given slack and distance target the nets plane/width is upgraded to a type that has better TOF characteristics to improve its timing. If the net is upgraded to a different plane/width, its TOF delay is recalculated (i.e., repeat process 3 and the computation of TOF delay). Therefore, in process 4 the computing device iterates through each pin and each net in the design. Decision 1 determines whether a pin fits criteria for being an upgrade candidate. Decision 2 determines whether all of the nets have been checked yet. Decision 3 determines if all of the wiring planes and widths upgrades have been checked.

In one embodiment, in process 5, once all the pins of all the nets have been thru process 4, all the nets are checked against new slack and distance targets and new wiring planes/width assignments that consume more wiring track resources. Then the computing device assigns a net to a given layer and width assignment and recalculates pin timing.

In one embodiment, once process 300 has iterated thru all the processes 1-5 for all the nets design, the sessions timing state then represents an unbufferred design with the nets assigned to wiring planes advantageous to a buffer tool to aid in the designs timing closure. Additionally, by having a buffer tool give priority to nets assigned to the more costly wiring types (i.e., the nets hardest to close timing on) the process 300 assures that those buffer circuits receive first choice for a more favorable placement in the design. In one embodiment, a quicker TAT on complex paths are shown in the generated design without waiting for buffering solutions to be completed.

Table 1 shows an example table and order of, slack targets, estimated TOF and wiring planes and widths used by one embodiment that is applied during process 5.

TABLE 1

| Slack Target (ps | TOF ps/mm | Wire Width | Planes Assignments |
|---|---|---|---|
| 0 ps | 270 ps/mm | Single | M4/IB |
| 0 ps | 160 ps/mm | Double | M4/M5 |
| −200 ps | 120 ps/mm | Single | B1/IB |
| 0 ps | 120 ps/mm | Single | B1/D3 |
| 0ps | 67 ps/mm | Double | B1/IB |
| 0 ps | 53 ps/mm | Single | E1/TB |
| 0 ps | 40 ps/mm | Double | E1/TB |
| 0 ps | 34 ps/mm | Single | IA/IB |
| 0 ps | 24 ps/mm | Double | IA/IB |

Table 2 shows an example metal stack that a chip design that is referenced in Table 1.

TABLE 2

| Wiring Planes | Wire Tracks |
|---|---|
| M1-M5 | 1x |
| B1 | 2x |
| B2 | 2x |
| E1 | 4x |
| E2 | 4x |
| IA | 10x |
| IB | 10x |

Figure 4:
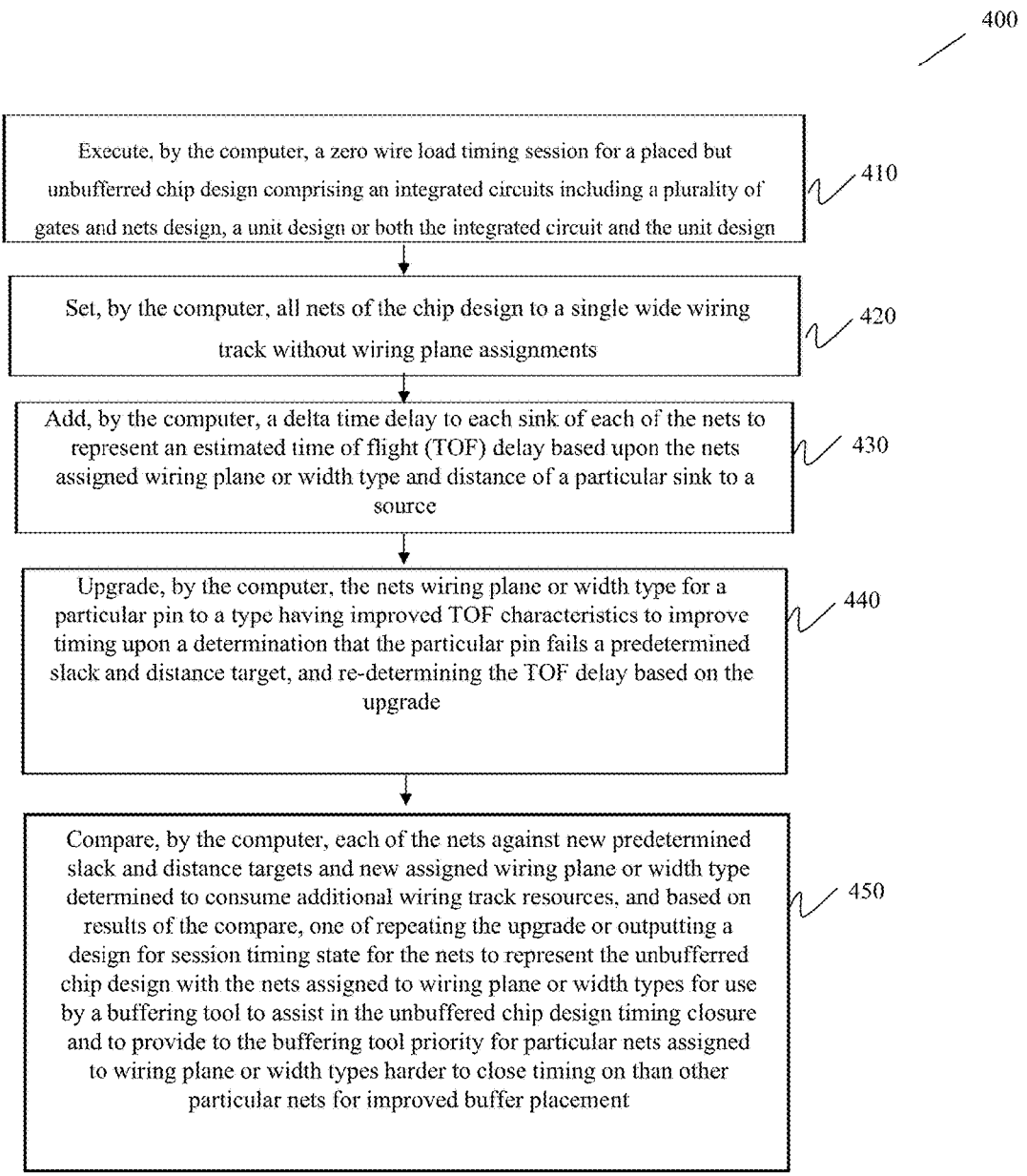
FIG. 4 illustrates a block diagram for a process for assigning nets to wiring planes for generating a chip design, according to one embodiment.

FIG. 4 illustrates a block diagram for a process 400 for assigning nets to wiring planes for generating a chip design, according to one embodiment. In one embodiment, the process 400 may be implemented using a computing process, a computing program, etc. In one embodiment, process 400 includes a computer program product for assigning nets to wiring planes for generating a chip design. The computer program product includes a computer readable storage medium having program instructions embodied therewith. The program instructions executable by a computer (e.g., a user device 116, FIG. 1, a workstation in system 200, FIG. 2, etc.) to cause the computer to perform process 400. In one embodiment, block 410 includes executing, by the computer, a ZWL timing session for a placed but unbuffered chip design that includes integrated circuits with millions of gates and nets design, a unit design or both the integrated circuits and the unit design. In block 420 all nets of the chip design are set by the computer to a single wide wiring track without wiring plane assignments. In block 430 the computer adds a delta time delay to each sink of each of the nets to represent an estimated time of flight (TOF) delay based upon the nets assigned wiring plane or width type and distance of a particular sink to a source. The TOF delay is equal to determining (TOF ps/mm for wiring plane or width type)*(sink to source distance in mm). In block 440 the computer upgrades the nets wiring plane or width type for a particular pin to a type having improved TOF characteristics to improve timing upon a determination that the particular pin fails a predetermined slack and distance target, and re-determining the TOF delay based on the upgrade. In block 450 the computer further compares each of the nets against new predetermined slack and distance targets and new assigned wiring plane or width type determined to consume additional wiring track resources. In one embodiment, based on results of the compare, the computer either repeats the upgrading or outputs a design for session timing state for the nets to represent the unbuffered chip design with the nets assigned to wiring plane or width types for use by a buffer tool to assist in the unbuffered chip design timing closure and to provide to the buffer tool priority for particular nets assigned to wiring plane or width types harder to close timing on than other particular nets for improved placement.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for assigning nets to wiring planes for generating a chip design, the computer program product comprising a computer readable storage device having program instructions embodied therewith, the program instructions executable by a computer to cause the computer to:

execute, by the computer, a zero wire load timing session for a placed but unbuffered chip design comprising integrated circuits including a plurality of gates and nets design, a unit design or both the integrated circuits and the unit design;

set, by the computer, all nets of the chip design to a single wide wiring track without wiring plane assignments;

add, by the computer, a delta time delay to each sink of each of the nets to represent an estimated time of flight (TOF) delay based upon the nets assigned wiring plane or width type and distance of a particular sink to a source, wherein the TOF delay is equal to determining (TOF pico second (ps)/millimeter (mm) for wiring plane or width type)*(sink to source distance in mm);

upgrade, by the computer, the nets wiring plane or width type for a particular pin to a type having improved TOF characteristics to improve timing upon a determination that the particular pin fails a predetermined slack and distance target, and re-determining the TOF delay based on the upgrade;

compare, by the computer, each of the nets against new predetermined slack and distance targets and new assigned wiring plane or width type determined to consume additional wiring track resources, and based on results of the compare, one of repeating the upgrade or outputting a design for session timing state for the nets to represent the unbufferred chip design with the nets assigned to wiring plane or width types for use by a buffering tool to assist in the unbuffered chip design timing closure and to provide to the buffering tool priority for particular nets assigned to wiring plane or width types harder to close timing on than other particular nets for improved buffer placement.

\* \* \* \* \*